United States Patent
Kosuge

(10) Patent No.: US 11,463,699 B2
(45) Date of Patent: Oct. 4, 2022

(54) IMAGE PROCESSING APPARATUS AND CONTROL METHOD THEREOF

(71) Applicant: SAMSUNG ELECTRONICS CO., LTD., Suwon-si (KR)

(72) Inventor: Tetsuo Kosuge, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 242 days.

(21) Appl. No.: 16/640,204

(22) PCT Filed: Aug. 3, 2018

(86) PCT No.: PCT/KR2018/008823
§ 371 (c)(1),
(2) Date: Feb. 19, 2020

(87) PCT Pub. No.: WO2019/045297
PCT Pub. Date: Mar. 7, 2019

(65) Prior Publication Data
US 2020/0186803 A1    Jun. 11, 2020

(30) Foreign Application Priority Data

Aug. 30, 2017 (KR) .................. 10-2017-0109775

(51) Int. Cl.
*G06K 9/36* (2006.01)
*H04N 19/13* (2014.01)
*H04N 19/85* (2014.01)

(52) U.S. Cl.
CPC ............. *H04N 19/13* (2014.11); *H04N 19/85* (2014.11)

(58) Field of Classification Search
CPC ...... H04N 19/85; H04N 19/91; H04N 19/423; H04N 19/13; H04N 19/10; H04N 19/189;
(Continued)

(56) References Cited

U.S. PATENT DOCUMENTS 9,661,339 B2    5/2017  Tan et al.
2014/0205198 A1  7/2014  Unno et al.
(Continued)

FOREIGN PATENT DOCUMENTS

JP    2011-077564    4/2011
JP    2014-143572    8/2014
(Continued)

OTHER PUBLICATIONS

International Search Report for PCT/KR2018/008823, dated Nov. 14, 2018, 4 pages.
(Continued)

*Primary Examiner* — Duy M Dang
(74) *Attorney, Agent, or Firm* — Nixon & Vanderhye, P.C.

(57) ABSTRACT

The disclosure relates to an image processing apparatus, the image processing apparatus including: an image signal receiver configured to receive an image signal; a first preprocessor configured to sequentially processes a predetermined section of the received image signal and generate a first intermediate signal; a second preprocessor arranged in parallel with the first preprocessor and configured to sequentially process another section of the image signal and generate a second intermediate signal; a storage configured to store the first intermediate signal and the second intermediate signal; and a postprocessor configured to perform signal processing with regard to the first and second intermediate signals stored in the storage, the size of the section being corresponding to processing speeds of the first and second preprocessors and a processing speed of the postprocessor.

15 Claims, 12 Drawing Sheets

(58) Field of Classification Search
CPC .... H04N 19/196; H04N 19/197; H04N 19/98; H04N 19/42; H04N 19/426; H04N 19/427; H04N 19/428; H04N 19/436; H03M 7/3046; H03M 7/3051; H03M 7/3084; H03M 7/6023
See application file for complete search history.

(56) References Cited

U.S. PATENT DOCUMENTS

| | | | |
|---|---|---|---|
| 2014/0321539 | A1 | 10/2014 | Tanaka et al. |
| 2015/0208076 | A1 | 7/2015 | Tan et al. |
| 2016/0345027 | A1* | 11/2016 | Winger ............... H04N 19/162 |
| 2018/0070107 | A1* | 3/2018 | Ramasubramonian ..................... H04N 19/70 |

FOREIGN PATENT DOCUMENTS

| | | |
|---|---|---|
| JP | 2015-100135 | 5/2015 |
| JP | 6023596 | 11/2016 |
| KR | 10-0775217 | 11/2007 |
| KR | 10-0999505 | 12/2010 |
| KR | 10-1485219 | 1/2015 |

OTHER PUBLICATIONS

Written Opinion of the ISA for PCT/KR2018/008823, dated Nov. 14, 2018, 7 pages.
Kim et al., "Parallel Decoding of Context-based Adaptive Binary Arithmetic Codes Based on Most Probable Symbol Prediction", Feb. 2007, IEICE, vol. E90-D Issue 2, http://dl.acm.org/citation.cfm?id=1226954&preflayout=tabs, 4 pages.
Office Action dated Jan. 14, 2022 in Korean Patent Application No. 10-2017-0109775 and summarized English-language translation.
Notice of Allowance dated Jul. 26, 2022 in Korean Patent Application No. 10-2017-0109775 and partial English-language translation.

* cited by examiner

IMAGE PROCESSING APPARATUS AND CONTROL METHOD THEREOF

This application is the U.S. national phase of International Application No. PCT/KR2018/008823 filed 3 Aug. 2018, which designated the U.S. and claims priority to KR Patent Application No. 10-2017-0109775 filed 30 Aug. 2017, the entire contents of each of which are hereby incorporated by reference.

FIELD

The disclosure relates to an image processing apparatus and a control method thereof, and more particularly to an image processing apparatus, in which an image signal is processed at high speed with less circuit cost, and a control method thereof.

DESCRIPTION OF RELATED ART

With launch of 4K-TV broadcasting and popularization of technology such as mirroring by which a screen of a mobile phone is displayed on a screen of a TV, etc., a need for processing a large image has increased.

However, it is difficult to process the large image in real time. One of the reasons is a bottleneck phenomenon that occurs while a decoder decodes an image signal encoded by entropy coding.

Specifically, in a case of the entropy coding for the large image, the blocks of the image are different in entropy coding length. As shown in FIG. 2, length fluctuation of the entropy coding for the blocks of the image is very wide. Therefore, time taken to decode the image signal encoded by the entropy coding is also largely different according to the blocks. This causes waiting time until the next processing is performed after the decoding. Further, the processing of the image signal is slowed down as much as the waiting time.

To solve this problem, one of the related arts has employed a plurality of decoders. However, the problem of the waiting time is still caused in the postprocessor of every decoder even though the plurality of decoders are employed, and a problem of increasing costs arises because a total number of circuits increases as many as the increased number of decoders

SUMMARY

Accordingly, an aspect of the disclosure is to provide an image processing apparatus in which an image signal is processed at high speed with less circuit cost.

According to an embodiment of the disclosure, there is provided an image processing apparatus including: an image signal receiver configured to receive an image signal; a first preprocessor configured to sequentially processes a predetermined section of the received image signal and generate a first intermediate signal; a second preprocessor arranged in parallel with the first preprocessor and configured to sequentially process another section of the image signal and generate a second intermediate signal; a storage configured to store the first intermediate signal and the second intermediate signal; and a postprocessor configured to perform signal processing with regard to the first and second intermediate signals stored in the storage, the size of the section being corresponding to processing speeds of the first and second preprocessors and a processing speed of the postprocessor. Thus, it is possible to reduce circuit costs while processing the image signal at high speed.

The section may include a signal sequentially referenced at preprocessing of the first or second preprocessor. Thus, all pieces of information needed for signal processing of a corresponding section are present within the corresponding section, and therefore the first and second preprocessors do not have to refer to each other at each processing. Accordingly, the parallel arrangement effect of the first and second preprocessors is maximized, and the processing speed is further improved.

The first and second preprocessors may perform binary arithmetic coding with regard to the image signal. Thus, the image processing is appliable to the image signal encoded by the entropy coding method of the binary arithmetic coding, and therefore an image signal of an ultra-high definition (UHD) level image is also processed at high speed with less cost.

While the postprocessor processes the first and second intermediate signals of the section stored in the storage, each of the first and second preprocessors may process a next section of the image signal.

The image processing apparatus may further include a controller configured to adjust the size of the section based on real-time processing speeds of the first and second preprocessors and the postprocessor. Thus, even though the preprocessors or the postprocessor are varied in the processing speed, it is possible to adaptively adjust the processing speed of the image processing apparatus, thereby carrying out the image processing at high speed without image lagging or a loss of the intermediate signal due to the waiting time in the postprocessor.

The image processing apparatus may further include a compressor configured to compress the first and second intermediate signals to be stored in the storage. Thus, it is possible to decrease time taken in storing the intermediate signal in the storage and reading the intermediate signal from the storage, thereby improving image processing performance. Further, it is economical because the burden of the hardware is lightened.

The compressor may include a splitter configured to split and output a first part to be compressed from the first and second intermediate signals. Thus, the compression is performed by distinguishing data of a higher compression efficiency and the other data, and therefore the intermediate signal is more efficiently compressed, thereby further improving the image processing performance.

The splitter may split the first part based on a signal amount and similarity between signals.

Compressed data output from the compressor may include at least one of information for controlling the postprocessor, information about the predetermined section, and information for decompressing the compression of the first part.

According to an embodiment of the disclosure, there is provided a method of controlling an image processing apparatus including: receiving an image signal; sequentially processing a predetermined section of the received image signal and generating a first intermediate signal; sequentially processing another section of the image signal in parallel with the generation of the first intermediate signal and generating a second intermediate signal; storing the first intermediate signal and the second intermediate signal; and performing signal postprocessing with regard to the first and second stored intermediate signals, the size of the section being corresponding to processing speeds of the first and second preprocessors and a processing speed of the postprocessor. Thus, it is possible to reduce circuit costs while processing the image signal at high speed.

The section may include a signal sequentially referenced at the generation of the first intermediate signal and the generation of the second intermediate signal. Thus, all pieces of information needed for signal processing of a corresponding section are present within the corresponding section, and therefore the first and second preprocessors do not have to refer to each other at each processing. Accordingly, the parallel arrangement effect of the first and second preprocessors is maximized, and the processing speed is further improved.

The generation of the first intermediate signal and the generation of the second intermediate signal include performing binary arithmetic coding with regard to the image signal. Thus, the image processing is appliable to the image signal encoded by the entropy coding method of the binary arithmetic coding, and therefore an image signal of an ultra-high definition (UHD) level image is also processed at high speed with less cost.

While the postprocessing is performed, a next section of the image signal may be performed in each of the generation of the first intermediate signal and the generation of the second intermediate signal.

The method may further include adjusting the size of the section based on real-time processing speeds at the generation of the first and second intermediate signals and the postprocessing. Thus, even though the preprocessors or the postprocessor are varied in the processing speed, it is possible to adaptively adjust the processing speed of the image processing apparatus, thereby carrying out the image processing at high speed without image lagging or a loss of the intermediate signal due to the waiting time in the postprocessor.

The method may further include compressing the first and second intermediate signals. Thus, it is possible to decrease time taken in storing the intermediate signal in the storage and reading the intermediate signal from the storage, thereby improving image processing performance. Further, it is economical because the burden of the hardware is lightened.

The compression may further include splitting a first part to be compressed from the first and second intermediate signals. Thus, the compression is performed by distinguishing data of a higher compression efficiency and the other data, and therefore the intermediate signal is more efficiently compressed, thereby further improving the image processing performance.

The splitting may include splitting the first part based on a signal amount and similarity between signals.

compressed data generated at the compression may include at least one of information for controlling the postprocessor, information about the predetermined section, and information for decompressing the compression of the first part.

A computer program according to an embodiment of the disclosure includes a computer program stored in a medium to execute one of the control methods combined to the image processing apparatus.

The computer program may be stored in a medium of the server and downloadable into the image processing apparatus through a network.

As described above, according to the disclosure, an image signal is processed at high speed with less circuit cost.

DETAILED DESCRIPTION OF EXAMPLE EMBODIMENTS

Figure 1:
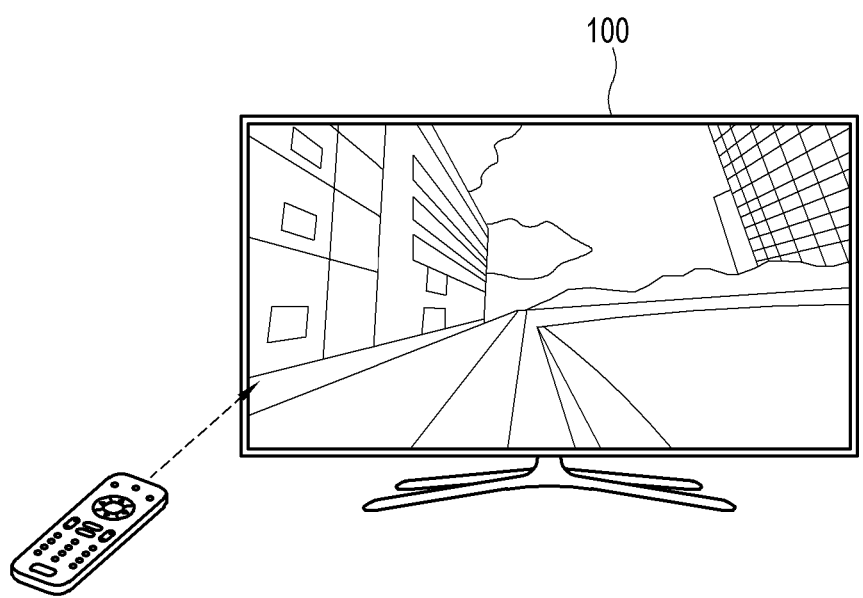
FIG. 1 illustrates an image processing apparatus the image processing apparatus according to an embodiment of the disclosure.
Figure 2:
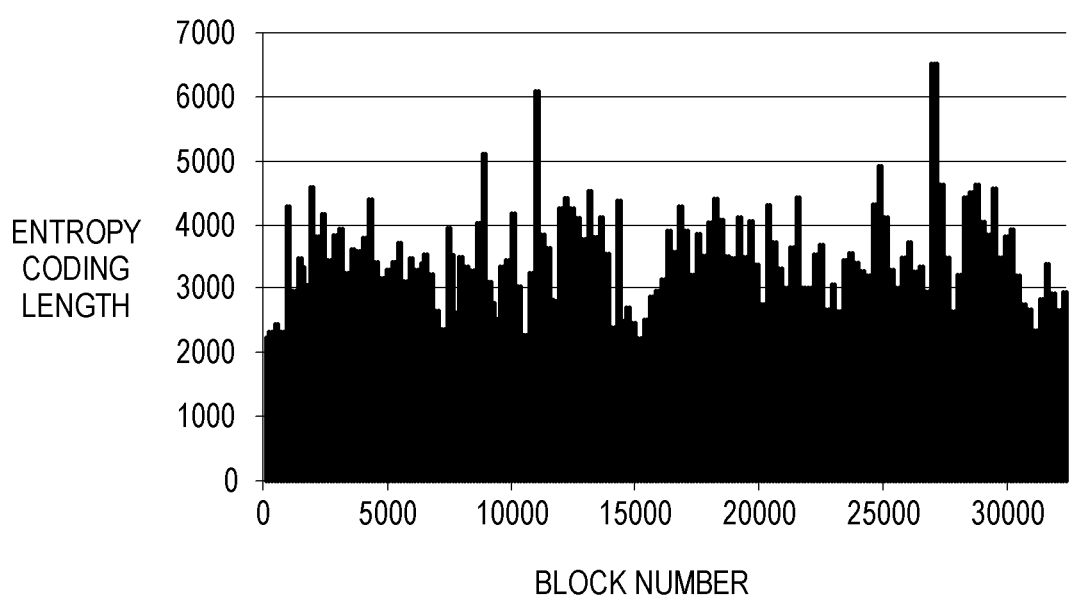
FIG. 2 illustrates a relationship between an image block of an image signal and an entropy coding length.

Below, embodiments of the disclosure will be described in detail with reference to the accompanying drawings. In the drawings, like numerals or symbols refer to like elements having substantially the same function, and the size of each element may be exaggerated for clarity and convenience of description. However, the technical concept of the disclosure and its key configurations and functions are not limited to those described in the following embodiments. In the following descriptions, details about publicly known technologies or configurations may be omitted if they unnecessarily obscure the gist of the disclosure.

In the following embodiments, terms 'first', 'second', etc. are used only to distinguish one element from another, and singular forms are intended to include plural forms unless otherwise mentioned contextually. In the following embodiments, it will be understood that terms 'comprise', 'include', 'have', etc. do not preclude the presence or addition of one or more other features, numbers, steps, operation, elements, components or combination thereof. In addition, a 'module' or a 'portion' may perform at least one function or operation, be achieved by hardware, software or combination of hardware and software, and be integrated into at least one module for at least one processor.

FIG. 1 illustrates an image processing apparatus the image processing apparatus according to an embodiment of the disclosure. The image processing apparatus 100 according to an embodiment of the disclosure may for example be achieved by a set-top box. Further, the image processing apparatus 100 according to another embodiment of the disclosure may be achieved by a display apparatus with a display, for example, a smartphone, a tablet computer, a mobile phone, a smartwatch, a head-mountable display or the like wearable device, a computer, a multimedia player, an electronic frame, a digital billboard, a large format display (LFD), a digital signage, etc. However, the image processing apparatus 100 according to an embodiment of the disclosure is not limited to these, and may include any apparatus capable of processing an image signal.

Figure 3:
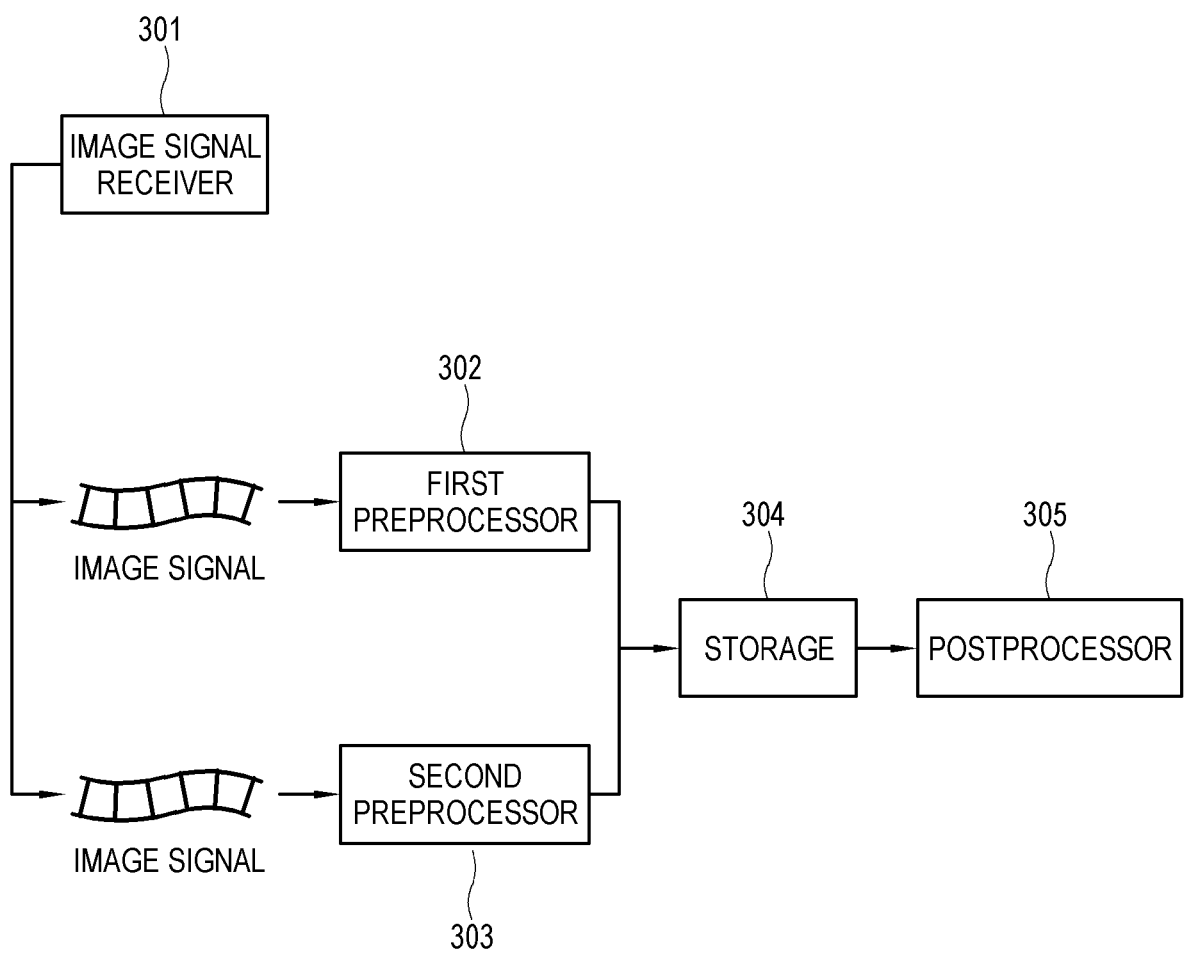
FIG. 3 illustrates a configuration of an image processing apparatus according to an embodiment of the disclosure.

FIG. 3 illustrates a configuration of an image processing apparatus according to an embodiment of the disclosure. The image processing apparatus 100 according to an embodiment of the disclosure includes an image signal receiver 301, a first preprocessor 302, a second preprocessor 303, a storage 304, and a postprocessor 305. However, the configuration of the image processing apparatus 100 shown in FIG. 3 is merely an example, and the image processing apparatus an embodiment of the disclosure may be achieved by another configuration. That is, the image processing apparatus according to an embodiment of the disclosure may include another element in addition to the configuration shown in FIG. 3, or exclude some elements from the configuration shown in FIG. 3.

The image signal receiver 301 receives an image signal. The image signal receiver 301 may include a tuner for receiving an image signal of a broadcast signal type. The tuner may receive a broadcast signal as tuned to a certain channel selected by a user among a plurality of channels. Alternatively, the image signal receiver 301 may receive an image signal from a camera, a server, a universal serial bus (USB) storage, a digital versatile disc (DVD), a computer or the like external apparatus.

The image signal receiver 301 may include a communicator that communicates with the external apparatus and receives an image signal. The communicator may be variously achieved according to the external apparatuses. For example, the communicator includes a connection portion for wired communication, and the connecting portion may transmit/receive a signal/data based on a high definition multimedia interface (HDMI), a HDMI-consumer electronics control (CEC), USB, a Component, etc. and include at least one connector or terminal corresponding to such standards. The communicator may perform wired communication with a plurality of servers through a wired local area network (LAN).

The communicator may be achieved by another communication method besides the connecting portion including the connector or terminal for the wired connection. For example, the communicator may include a radio frequency (RF) circuit that transmits/receives an RF signal to perform wireless communication with the external apparatus, and may be configured to perform one or more communication methods such as Wi-Fi, Bluetooth, Zigbee, ultra-wide band, wireless USB, and near field communication (NFC).

The first preprocessor 302 generates a first intermediate signal by sequentially processing a predetermined section of an image signal received through the image signal receiver 301. Here, the predetermined 'section' of the image signal refers to a part of the image signal, which is used as a basic unit of the image signal in generating the first intermediate signal to be stored in the storage 304 as a result of being successively or sequentially processed by the first preprocessor 302. As examples of the predetermined section, there are a section corresponding to one frame or a plurality of frames of an image, a section corresponding to a unit block used for entropy coding or decoding within one frame, etc. However, the predetermined section is not limited to these examples, and may include any section as long as it corresponds to a part of the image signal.

Processing in the first preprocessor 302 (hereinafter, referred to as 'preprocessing') refers to signal processes sequentially carried out in a predetermined section of an image signal, for example, like a process for decoding the image signal encoded by the entropy coding with regard to a large image. For example, in a case of a video decoder such as high efficiency video coding (HEVC) and H.264/advanced video coding (AVC), the first preprocessor 302 may correspond to an entropy decoder. However, the preprocessing is not limited to this example. Further, time taken in the preprocessing to process detailed units of the corresponding section may be irregular.

The second preprocessor 303 is arranged in parallel with the first preprocessor 302, and generates a second intermediate signal by sequentially processing another section of the image signal received through the image signal receiver 301. Except this, the second processor 303 is equivalent to the first preprocessor 302.

The storage 304 is configured to store the first and second intermediate signals stored in the first preprocessor 302 and the second preprocessor 303. The storage 304 may include a flash memory, an erasable and programmable read only memory (EPROM), an electrically erasable and programmable read only memory (EEPROM) or the like nonvolatile memory, and may include a dynamic random access memory (DRAM), a static random access memory (SRAM) or the like volatile memory.

The postprocessor 305 performs signal processing with regard to the first and second intermediate signals stored in the storage 304. Signal processing in the postprocessor 305 (hereinafter, referred to as 'postprocessing') may include any signal processing to be carried out with regard to the first and second intermediate signals, i.e. the signals processed by the first preprocessor 302 or the second preprocessor 303 and then stored in the storage 304. For example, in a case of HEVC, H.264/AVC or the like video decoder, the postprocessor 305 may include at least some of the inverse quantization, inverse transform, intra prediction, motion compensation, deblocking filter applying, sample adaptive offset filter applying, and the like processing, but not limited to these examples.

Figure 4:
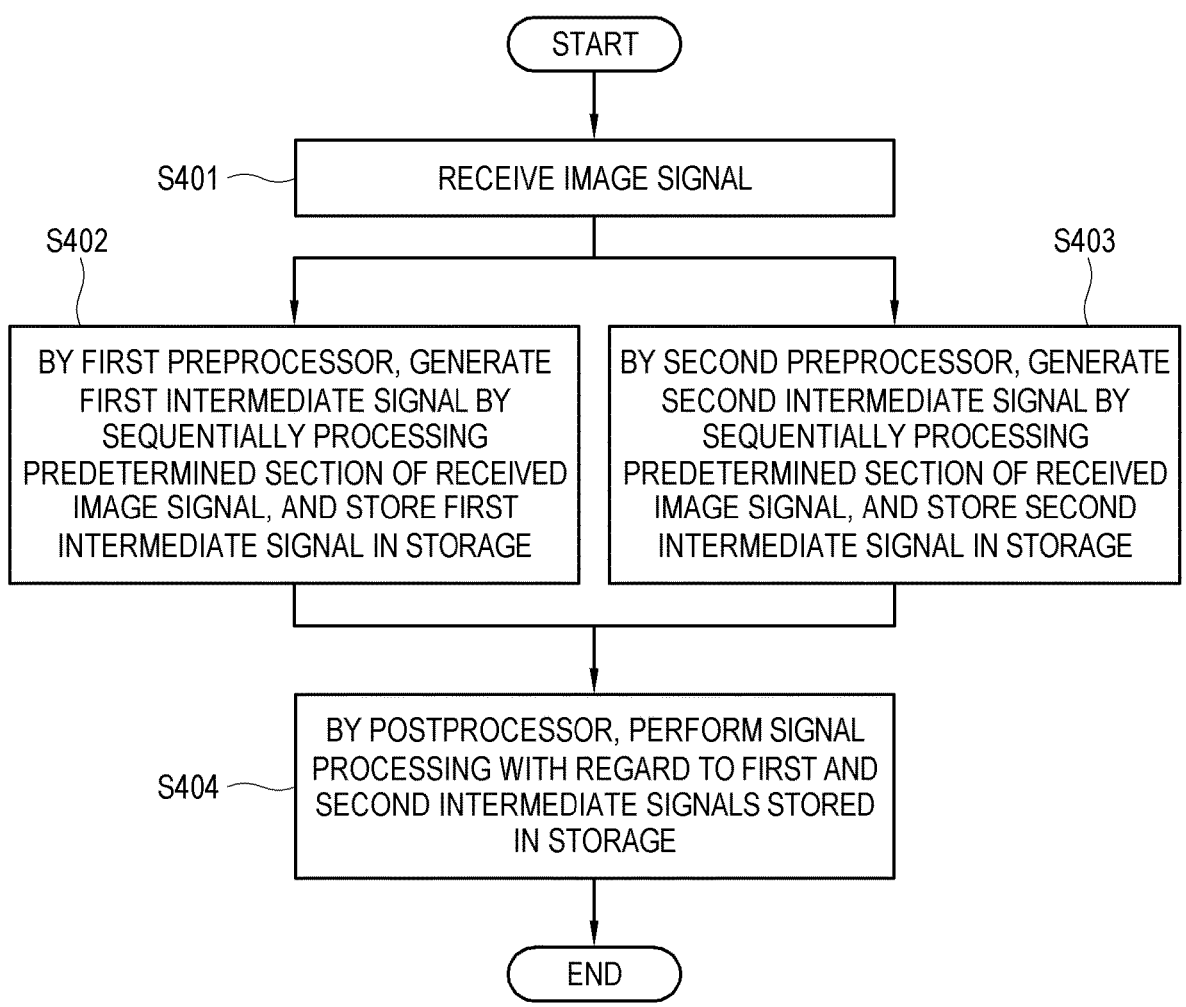
FIG. 4 illustrates a control method of an image processing apparatus according to an embodiment of the disclosure.

FIG. 4 illustrates a control method of an image processing apparatus according to an embodiment of the disclosure. The signal receiver 301 of the image processing apparatus 100 according to an embodiment of the disclosure receives an image signal (S401). When the image signal is received, the first preprocessor 302 of the image processing apparatus 100 according to an embodiment of the disclosure generates the first intermediate signal by sequentially processing a predetermined section of the received image signal, and stores the first intermediate signal in the storage 304 (S402). At the same time, the second preprocessor 303 generates the second intermediate signal by sequentially processing another section of the image signal, and stores the second intermediate signal in the storage 304 (S403). Meanwhile, the postprocessor 305 performs signal processing with regard to the first and second intermediate signals stored in the storage 304 (S404).

In the foregoing image processing apparatus 100 according to an embodiment of the disclosure, the first and second preprocessors 302 and 303 (hereinafter, also collectively referred to as 'preprocessors') for carrying out the preprocessing with regard to the image signal and the postprocessor 305 for carrying out the postprocessing with regard to the first and second intermediate signals (hereinafter, also collectively referred to as an 'intermediate signal') obtained by preprocessing the image signal are functionally separated to operate independently of each other without referring to each other or waiting every time. In other words, while the preprocessors 302 and 303 generate the intermediate signal by processing a signal of a predetermined section and the storage 304 stores the intermediate signal, the postprocessor 305 carries out the postprocessing with regard to the intermediate signal by only identifying whether the intermediate signal to be subjected to the postprocessing is present in the storage 304, without referring to the processing procedures or circumstances of the preprocessors 302 and 303.

Therefore, unlike the related art in which the postprocessing cannot be carried out until the processing result of the preprocessor is produced with regard to every unit block of the entropy coding, and the related art in which the postprocessor needs to be continuously on standby because it is unpredictable when the processing of the preprocessor is finished in the case where time taken in the preprocessor to process the corresponding block is irregular, the image processing apparatus 100 according to an embodiment of the disclosure decreases the waiting time of the postprocessor 305 and speeds up the processing of the image signal. Further, as compared with the related art in which the postprocessors are provided respectively corresponding to the preprocessors, a fewer number of postprocessors are needed for the same number of preprocessors as those of the related art, thereby downsizing the whole circuit system and economically processing an image signal with less cost.

Further, in the image processing apparatus 100 according to an embodiment of the disclosure, the storage 304 just serves as a medium between the preprocessors 302 and 303 and the postprocessor 305, but the preprocessors 302 and 303 and the postprocessor 305 operate independently of each other without referring to each other, thereby making the postprocessor 305 free from variable preprocessing time even though the processing time taken in the preprocessors 302 and 303 to process a predetermined section is varied depending on the section. In addition, the disclosure is appliable to an image signal which needs to be processed by referring to a processing result of a previous signal when a certain signal within a predetermined section is processed, because the preprocessors 302 and 303 sequentially process the image signals within the predetermined section.

A unit to be processed in the preprocessors 302 and 303, i.e. the size of the 'section' corresponds to a processing speed of the preprocessors 302 and 303 and a processing speed of the postprocessor 305. When the size of the section does not match the processing speed of the preprocessors 302 and 303 and the processing speed of the postprocessor 305, for example, when the size of the section processed by the preprocessors 302 and 303 per unit time does not keep up with the processing speed of the postprocessor 305 even though the processing speed of the postprocessor 305 is faster than the processing speed of the preprocessors 302 and 303, the intermediate signal to be processed by the postprocessor 305 is not left in the storage 304 at a certain point in time because the amount of intermediate signal output from the storage 304 is less than the amount of intermediate signal input to the storage 304. On the other hand, when the size of the section processed by the preprocessors 302 and 303 per unit time does not keep up with the processing speed of the postprocessor 305 even though the processing speed of the preprocessors 302 and 303 is faster than the processing speed of the postprocessor 305, the intermediate signal is continuously accumulated in the storage 304. When such an accumulated amount of intermediate signal exceeds the capacity of the storage, a signal loss occurs because the intermediate signal is overwritten with another intermediate signal before being postprocessed by the postprocessor 305. It is possible to prevent this phenomenon when the size of the section is set to match the processing speed of the preprocessors 302 and 303 and the processing speed of the postprocessor 305. In result, image processing is carried out at high speed without image lagging or a loss of the intermediate signal due to the waiting time.

Although it is described above that the image processing apparatus 100 according to an embodiment of the disclosure includes two preprocessors 302 and 303 and one postprocessor, there are no limits to the number of preprocessors and the number of postprocessors. The number of preprocessors and the number of postprocessors may be varied depending on how long it takes to carry out the preprocessing and the postprocessing with regard to an image signal.

Figure 5:
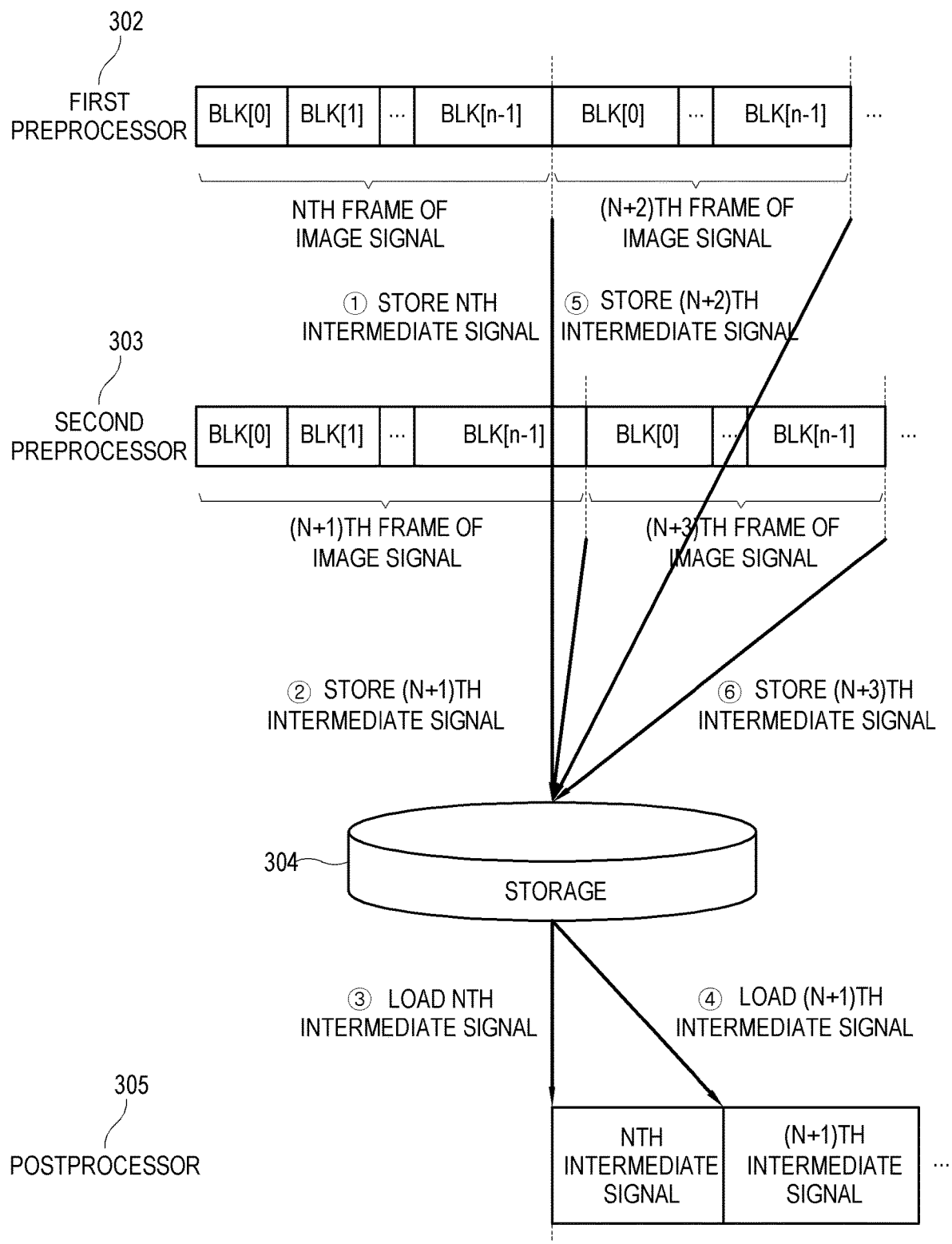
FIG. 5 illustrates operation of an image processing apparatus according to an embodiment of the disclosure.

FIG. 5 illustrates detailed operation of an image processing apparatus according to an embodiment of the disclosure. For convenience of description, FIG. 5 shows an example that the section as a unit to be processed in the preprocessors 302 and 303 corresponds to each frame of the image. However, the section is not limited to this example.

In the image processing apparatus 100 according to an embodiment of the disclosure, the first preprocessor 302 processes an image signal corresponding to the $N^{th}$ frame (or frame [N]) of a received image signal. At the same time, the second preprocessor 303 arranged in parallel with the first preprocessor 302 processes an image signal corresponding to the $(N+1)^{th}$ frame. Here, when the processing performed in the preprocessors 302 and 303 may for example include decoding a signal encoded by the entropy coding according to image blocks within each image frame, the preprocessors 302 and 303 sequentially process the signals corresponding to the image blocks in the respective frames, thereby processing the image signal of each frame. Then, each of the preprocessors 302 and 303 generates an intermediate signal after processing the image signal of each frame, and stores the intermediate signal in the storage 304 (①, ②). Here, the image signals respectively corresponding to the frames encoded by the entropy coding may be different in size, and the image signals of the frames may be different in total decoding time even though the image signals have the same size. Although the first preprocessor 302 and the second preprocessor 303 start respectively processing the image signals of the frames at the same time, the intermediate signals may be therefore generated and stored in the storage 304 at different points in time.

As above, separately from each processing of the preprocessors 302 and 303 with regard to the image signal of each frame, the postprocessor 305 may read the intermediate signal from the storage 304 and process the intermediate signal. In other words, the postprocessor 305 may perform the postprocessing without waiting for the processing result of the preprocessors 302 and 303 each time. However, the postprocessor 305 needs to wait a certain period of time while any intermediate signal is not stored in the storage 304, for example, until the intermediate signal is generated by the preprocessors 302 and 303 and stored in the storage 304 for the first time, and therefore the initial image processing time may be delayed. After the delayed time, the postprocessing is independently performed without waiting for the processing results of the preprocessors 302 and 303.

Referring back to FIG. 5, when the first preprocessor 302 processes the image signal of the $N^{th}$ frame to generate the $N^{th}$ intermediate signal and stores the $N^{th}$ intermediate signal in the storage 304, the postprocessor 305 reads the $N^{th}$ intermediate signal from the storage 304 and applies the postprocessing to the $N^{th}$ intermediate signal. Then, the postprocessor 305 reads the $(N+1)^{th}$ intermediate signal from the storage 304 directly after the postprocessing for the $N^{th}$ intermediate signal is finished, and successively performs the postprocessing with regard to the $(N+1)^{th}$ intermediate signal (③, ④).

Meanwhile, while the postprocessor 305 processes the first and second intermediate signals of a predetermined section stored in the storage 304 as above, the first preprocessor 302 and the second preprocessor 303 process the next section of the image signal. That is, while the postprocessor 305 processes the $N^{th}$ intermediate signal corresponding to the image signal of the $N^{th}$ frame and the $(N+1)^{th}$ intermediate signal corresponding to the image signal of the $(N+1)^{th}$ frame stored in the storage 304, the first preprocessor 302 processes an image signal of the $(N+2)^{th}$ frame and at the same time the second preprocessor 303 processes an image signal of the $(N+3)^{th}$ frame (⑤, ⑥). When a balance is kept between the processing speed of the preprocessors 302 and 303 and the processing speed and the postprocessor 305, for example, when each of the preprocessors 302 and 303 processes the image signal corresponding to one frame while the postprocessor 305 averagely processes the intermediate signals corresponding to two frames, the image processing apparatus 100 can process the image signal without the waiting time of the postprocessor and speeds up image processing faster than that of the related art.

In the image processing apparatus 100 according to an embodiment of the disclosure, the 'section' as the unit of the preprocessors 302 and 303 may include signals sequentially referenced while the preprocessors 302 and 303 are preprocessing the image signal. For example, when the preprocessing of the preprocessors 302 and 303 is binary arithmetic decoding, preprocessing results of an image signal corresponding to previous image blocks within one 'frame' of an image are sequentially referenced in order to preprocess the image signal corresponding to the frame. Therefore, in this case, when a predetermined section includes signals sequentially referenced in terms of preprocessing the image signal, the predetermined section includes each frame. However, there are no limits to the predetermined section corresponding to one frame. Alternatively, a predetermined section may correspond to a plurality of frames. In other words, the preprocessors 302 and 303 may perform preprocessing in units of a plurality of frames. Thus, all pieces of information needed for signal processing of a corresponding section are present within the corresponding section, and therefore the first and second preprocessors 302 and 303 do not have to refer to each other at each processing. Accordingly, the parallel arrangement effect of the first and second preprocessors 302 and 303 is maximized, and the processing speed is further improved.

Figure 7:
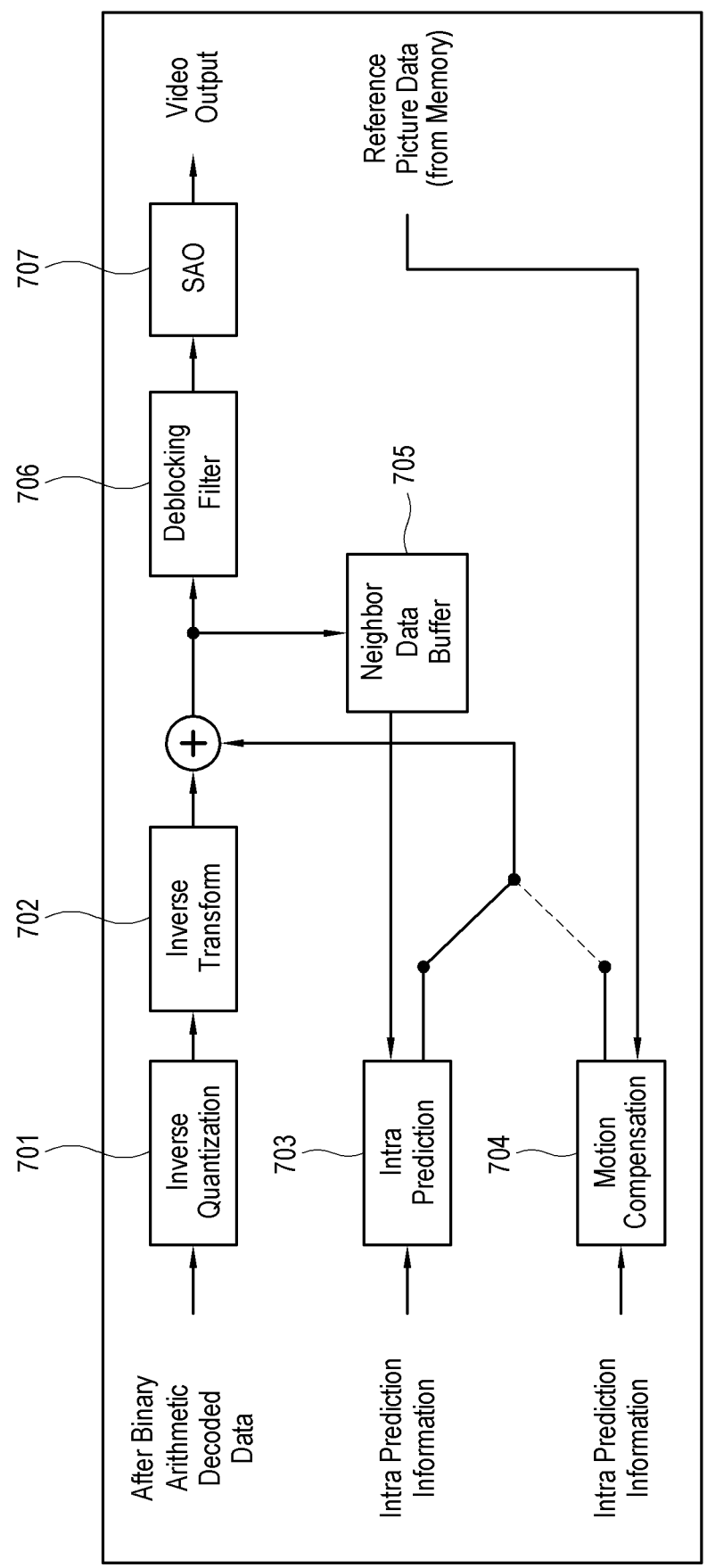
FIG. 7 illustrates a detailed configuration of a postprocessor according to an embodiment of the disclosure.

In the image processing apparatus 100 according to an embodiment of the disclosure, the preprocessors 302 and 303 may perform the binary arithmetic decoding with regard to a received image signal. In this case, the postprocessor 305 may perform the rest postprocessing with regard to the intermediate signal processed by the binary arithmetic decoding. In this case, the postprocessor 305 may for example be configured as shown in FIG. 7. That is, when the preprocessors 302 and 303 carry out the binary arithmetic decoding, the postprocessor 305 may include an inverse quantizer 701, an inverse transformer 702, an intra predictor 703, a motion compensator 704, a neighbor data buffer 705, a deblocking filter 706, a sample adaptive offset filter 707. However, the configuration of the postprocessor 305 is not limited to this example. With this, the image processing according to the disclosure is appliable to the image signal encoded by the entropy coding method of the binary arithmetic coding, and therefore an image signal of an ultra-high definition (UHD) level image is also processed at high speed with less cost.

Figure 6:
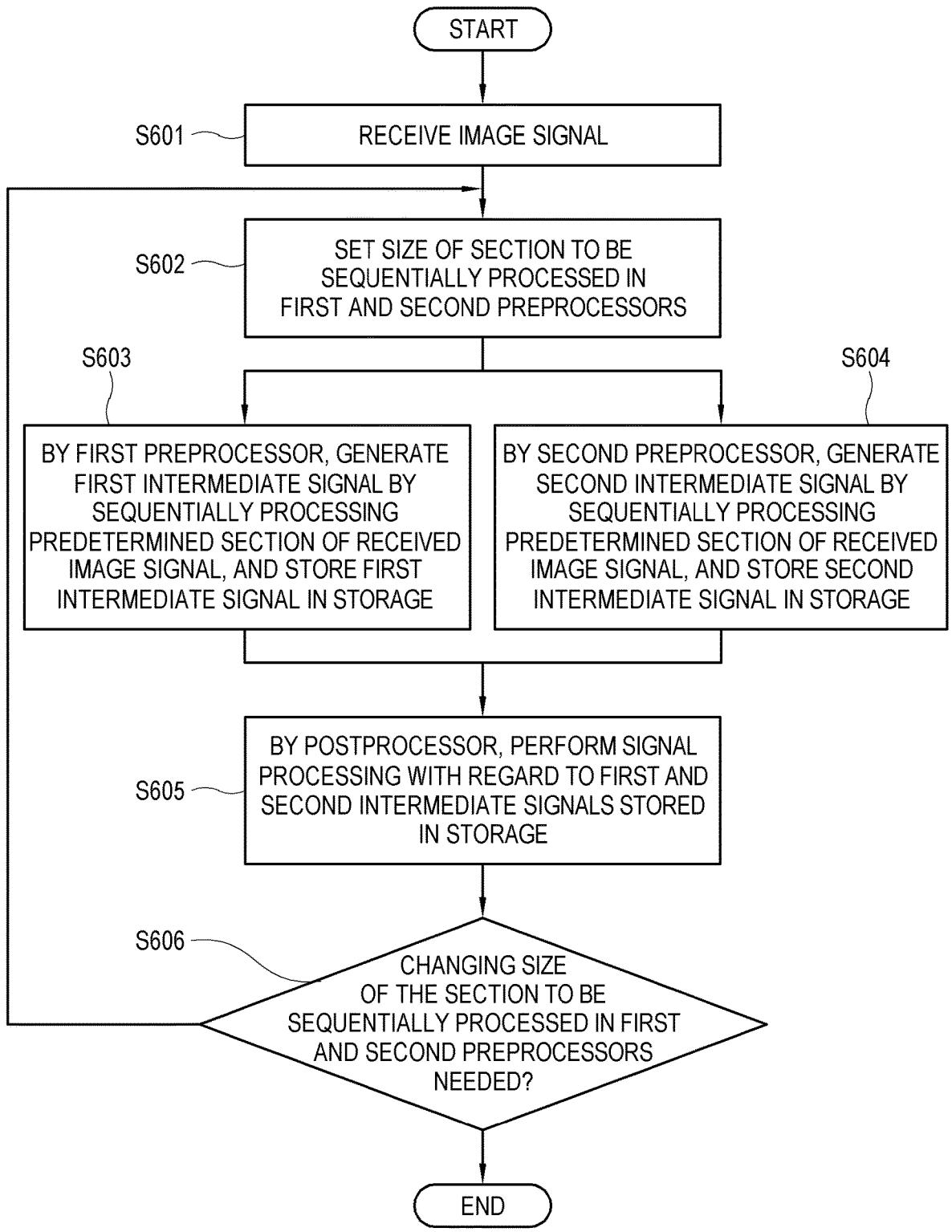
FIG. 6 illustrates a control method of an image processing apparatus according to another embodiment of the disclosure.

The image processing apparatus 100 according to another embodiment of the disclosure may include a controller configured to adjust the size of the predetermined section based on real-time processing speed of the preprocessors 302 and 303 and the postprocessor 305. Referring to FIG. 6, a control method of the image processing apparatus according to this embodiment of the disclosure will be described.

The signal receiver 301 of the image processing apparatus 100 according to this embodiment of the disclosure receives an image signal (S601). Then, the image processing apparatus 100 sets the size of the section to be sequentially processed by the preprocessors 302 and 303 (S602). When the real-time processing speeds of the preprocessors 302 and 303 and the postprocessor 305 are not measured yet, the size of the section may be set as a default size or may be set based on a value used at previous image processing. However, there are no limits to the size of the section.

Next, the first preprocessor 302 of the image processing apparatus 100 according to this embodiment of the disclosure generates the first intermediate signal by sequentially processing a predetermined section of the received image signal and stores the first intermediate signal in the storage 304 (S603). At the same time, the second preprocessor 303 generates the second intermediate signal by sequentially processing another section of the image signal, and stores the second intermediate signal in the storage 304 (S604). Meanwhile, the postprocessor 305 carries out signal processing with regard to the first and second intermediate signals stored in the storage 304 (S605).

While the preprocessor 302 and the postprocessor 305 perform their own processing as above, the controller of the image processing apparatus 100 according to this embodiment of the disclosure may measure the real-time processing speeds of the preprocessors 302 and 303 and the postprocessor 305. Based on the measuring results, the controller identifies whether there is a need of changing the size of the section to be sequentially processed by the preprocessors 302 and 303 (S606), and changes the size of the predetermined section when the change is needed, so that the section changed in size can be processed when it is processed by the preprocessors 302 and 303 in the future.

For example, under condition that the size of the section is set to correspond to 'three frames' and each of the first preprocessor 302 and the second preprocessor 303 sequentially processes 'three frames' per unit time, when the postprocessor 305 has a processing speed of 'six frames' per unit time, there are no needs of changing the size of the section to be processed in the preprocessors 302 and 303, and therefore the controller does not change the size of the section.

However, when it is measured in real time that the postprocessor 305 is speeded up to have a processing speed of 'eight frames' per unit time, the sum of the processing speeds of the preprocessors 302 and 303 does not reach the processing speed of the postprocessor 305. When such a state is accumulated, the intermediate signal to be processed by the postprocessor 305 is not left in the storage 304 and thus the waiting time occurs in the postprocessor 305, thereby slowing down the processing speed of the image signal as much as the waiting time. Therefore, in this case (within a processible speed of the preprocessor), the controller may increase the size of the section to be sequentially processed in each preprocessor to correspond to 'four frames'.

On the other hand, when it is measured in real time that the postprocessor 305 is slowed down to have a processing speed of 'four frames' per unit time, the sum of the processing speeds of the preprocessors 302 and 303 is faster than the processing speed of the postprocessor 305. When such a state is accumulated, there is an intermediate signal overwritten with another intermediate signal before being subjected to the postprocessing of the postprocessor 305, thereby causing a signal loss. Therefore, in this case (within a processible speed of the preprocessor), the controller may increase the size of section to be sequentially processed in each preprocessor to correspond to 'six frames'.

Thus, even though the preprocessors 302 and 303 or the postprocessor 305 are varied in the processing speed, it is possible to adaptively adjust the processing speed of the image processing apparatus, thereby carrying out the image processing at high speed without image lagging or a loss of the intermediate signal due to the waiting time in the postprocessor 305.

Meanwhile, in the related art as a contrast to the disclosure, for example, in the art using a plurality of decoders at the binary arithmetic decoding, an example that the preprocessing and the postprocessing are performed according to basic units, i.e. image 'blocks' used at the entropy coding for one frame image will be given. On the contrary to the related art, the preprocessors 302 and 303 according to an embodiment of the disclosure performs the preprocessing with regard to an image signal in units of a predetermine 'section' to generate the intermediate signal, and the postprocessor 305 also performs the postprocessing with regard to the intermediate signal generated in units of the predetermined 'section'. Here, the predetermined 'section' may refer to one frame as well as the 'block' and may further refer to a plurality of frames. Therefore, the data size of the intermediate signal stored in the storage 304 and read from the storage 304 may be much bigger than the data size of the existing image 'block'. It may take much time to store an intermediate signal having a big data size in the storage 304 and read this intermediate signal from the storage 304, and a financial burden is added because a circuit capable of transmitting and storing the big size data is required in terms of hardware.

Figure 8:
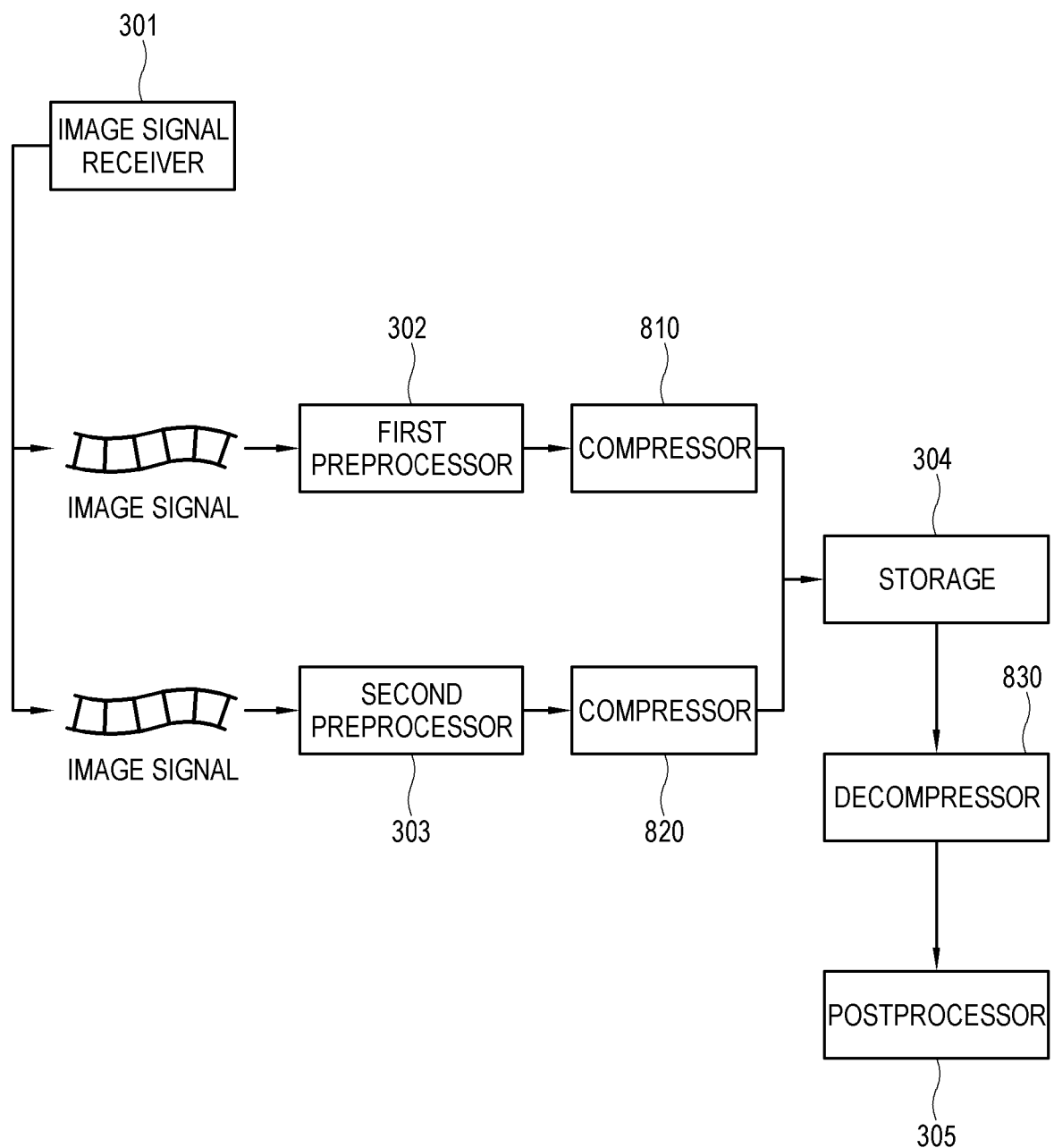
FIG. 8 illustrates a configuration of an image processing apparatus according to still another embodiment of the disclosure.

To solve this problem, FIG. 8 illustrates a configuration of an image processing apparatus 100 according to still another embodiment of the disclosure. The image processing apparatus 100 according to this embodiment of the disclosure includes compressors 810 and 820 that may compress a preprocessed intermediate signal and stores the compressed intermediate signal in the storage 304. Further, the image processing apparatus 100 may additionally include a decompressor 830 that reads the compressed and stored intermediate signal from the storage 304 and decompresses the compressed intermediated signal.

In FIG. 8, the compressors 810 and 820 are provided corresponding to the preprocessors, respectively. That is, the compressor 810 may compress the first intermediate signal generated in the first preprocessor 302, and the compressor 820 may compress the second intermediate signal generated in the second preprocessor 303. However, the configuration of the compressor is not limited to this embodiment. For example, the number of compressors may be different from the number of preprocessors. To increase a compression efficiency, the compressors 810 and 820 may perform compression in order of higher compression rates with respect to original data, for example, in an order in which the sums of absolute differential values from previous data is minimized.

Figure 9:
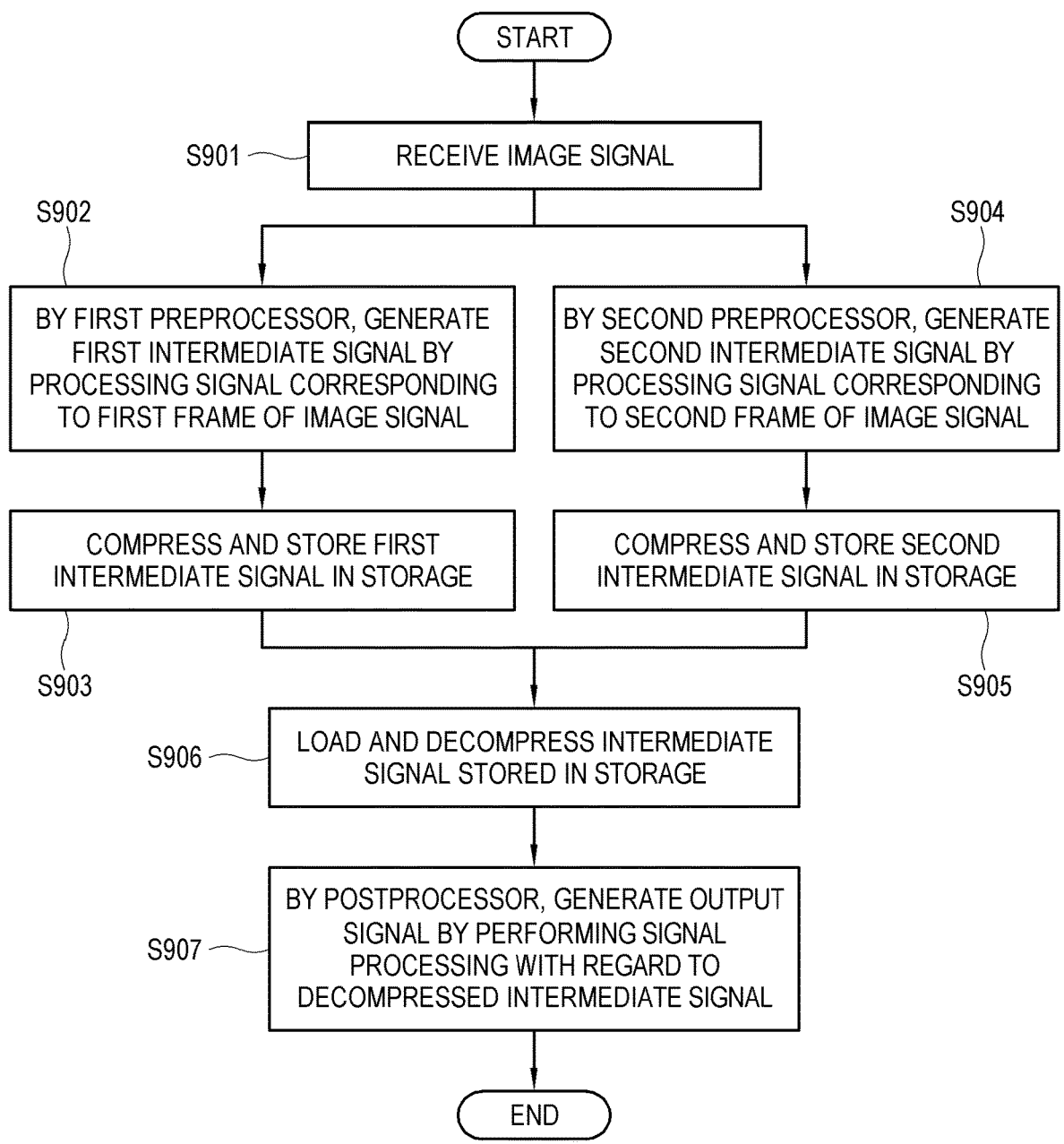
FIG. 9 illustrates a control method of an image processing apparatus according to still another embodiment of the disclosure.

FIG. 9 illustrates a control method of an image processing apparatus according to still another embodiment of the disclosure. FIG. 9 shows a case that a predetermined section is set in units of frame, but the predetermined section according to the disclosure is not limited to the frame unit.

In the image processing apparatus 100 according to this embodiment of the disclosure, the signal receiver 301 receives an image signal (S901). When the image signal is received, the first preprocessor 302 of the image processing apparatus 100 sequentially processes a first frame of the received image signal and generates a first intermediate signal (S902). The compressor 810 compresses the first intermediate signal generated in the first preprocessor 302, and the first compressed intermediate signal is stored in the storage 304 (S903).

While the first intermediate signal is generated, compressed and stored as above, the second preprocessor 303 sequentially processes another section of the image signal, for example, a second frame, thereby generating the second intermediate signal (S904). The compressor 820 compresses the second intermediate signal generated in the second preprocessor 302, and the second compressed intermediate signal is stored in the storage 304 (S905).

Meanwhile, the decompressor 830 loads and decompresses the first and second compressed intermediate signals stored in the storage 304 so that the postprocessor 305 can process the first and second intermediate signals (S906). Then, the postprocessor 305 performs signal processing with regard to the first and second decompressed intermediate signals (S907). Further, the postprocessor 305 generates an output signal as a result of signal processing, so that the output signal can be output as an image.

Thus, it is possible to decrease time taken in storing the intermediate signal in the storage and reading the intermediate signal from the storage, thereby improving image processing performance. Further, it is economical because the burden of the hardware is lightened.

Figure 10:
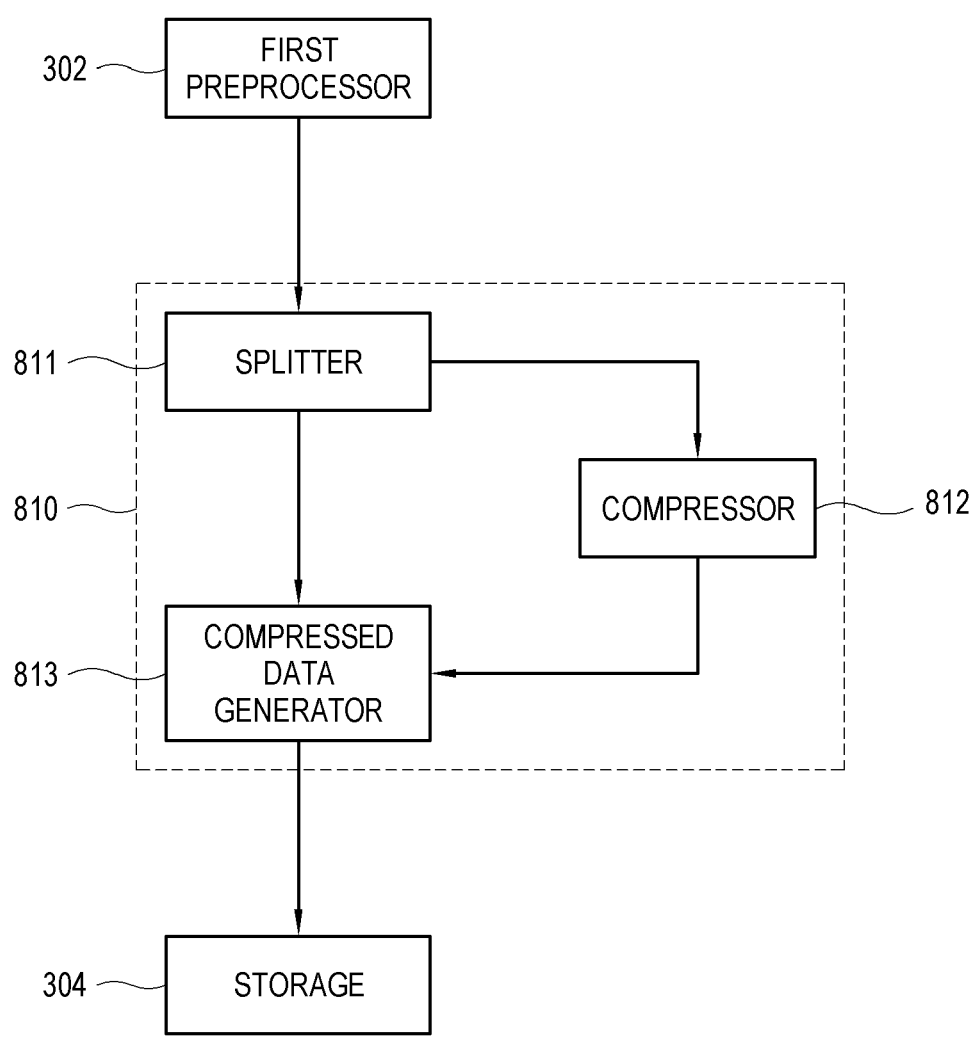
FIG. 10 illustrates a detailed configuration of a data compressor according to still another embodiment of the disclosure.

The image processing apparatus 100 with the compressors 810 and 820 according to this embodiment of the disclosure may perform the compression by distinguishing between a part of the intermediate signal suitable for the compression and the other part unsuitable for the compression. This will be described with reference to FIG. 10.

The compressors 810 and 820 of the image processing apparatus 100 according to still another this embodiment of the disclosure may include a splitter 811 to split a first part to be compressed from the intermediate signal and output the first part. Further, there are provided a compressor 812 to compress the first part, and a compressed data generator 813 to receive the compressed first part and the other uncompressed part and generate the compressed data.

In this case, the splitter 811 identifies a part suitable for compression and a part unsuitable for compression from the intermediate signal, transmits the first part suitable for the compression to the compressor 812 so as to be compressed, and transmits the other part directly to the compressed data generator 813. The compressed data generator 813 receives the compressed data of the first part compressed in the compressor 812 and the uncompressed data from the splitter 811, generates the compressed data from the received compressed and uncompressed data, thereby transmitting the compressed data to the storage 304.

Thus, the compression is performed by distinguishing data of a higher compression efficiency and the other data, and therefore the intermediate signal is more efficiently compressed, thereby further improving the image processing performance.

As an example of splitting the first part from the intermediate signal by the splitter 811, the splitter 811 may split the first part based on the amount of signal and similarity between signals. For example, a part of the intermediate signal, in which a large amount of signal is included and there is high similarity between signals, may be compressed with a higher compression rate than that of the other part, and thus the splitter 811 splits this part as the first part.

For example, when the binary arithmetic coding is used as the entropy coding for an image signal, data about a conversion coefficient of the image signal (i.e. coefficient data) in the intermediate signal obtained by applying the binary arithmetic decoding to the image signal corresponds to a part in which a large amount of signal is included and there is high similarity between signals, and thus identified as the first part. A detailed example of compressing such a first part is as follows. The compressor 812 removes similarity in coefficient data from the first part through differential pulse-code modulation (DPCM), and reduces the amount of information through Golomb-Rice coding. Then, the compressor 812 identifies whether all the coefficient data of the processed first part is '0'. When all the coefficient data of the processed first part is not '0', 'All_0_Flag' of is set as 'False' and 'All_0_Flag' and the compressed data are output. On the other hand, when all the coefficient data of the processed first part is '0', 'All_0_Flag' is set and output as 'True' and the compressed data is not output.

Figure 11:
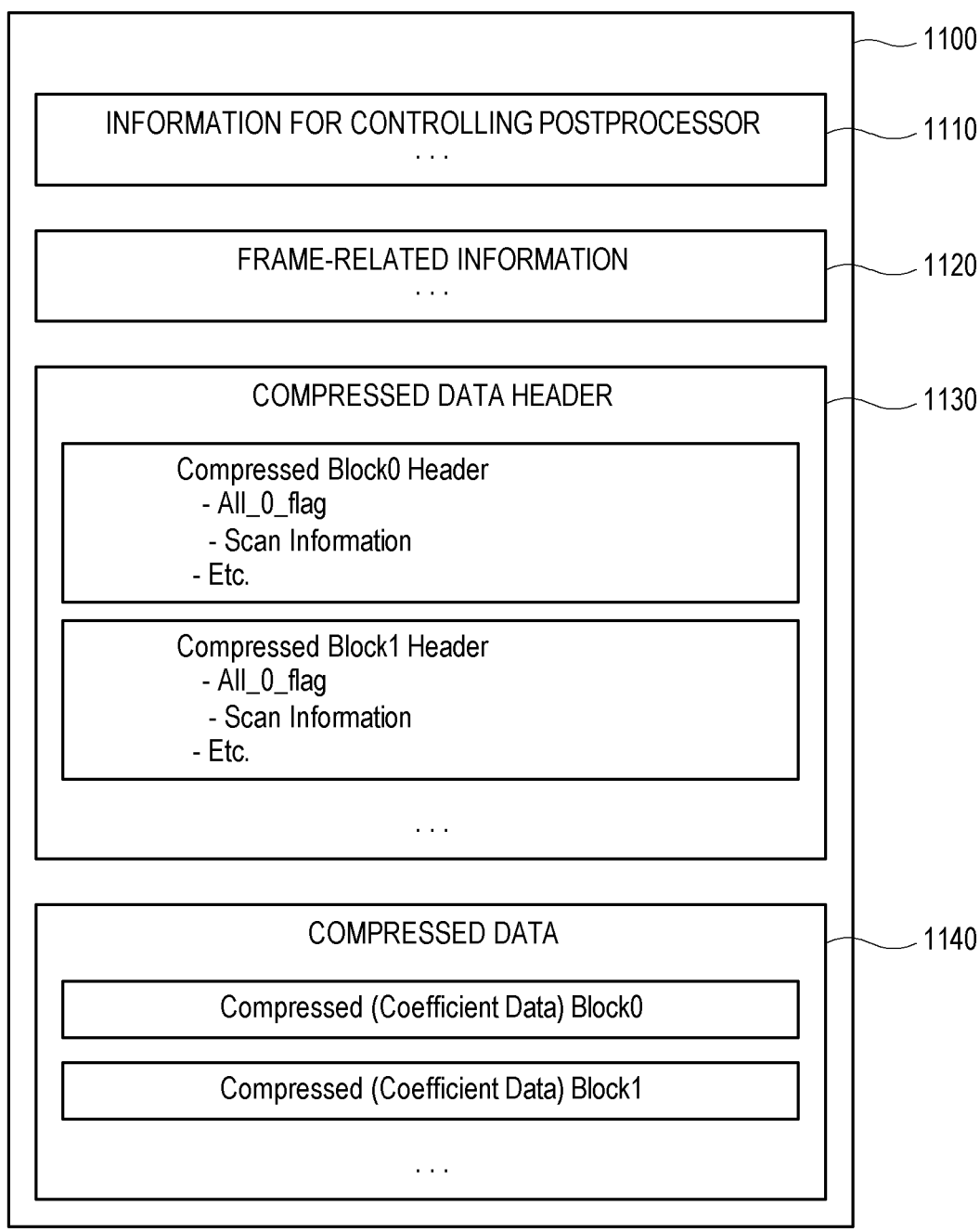
FIG. 11 illustrates a structure of compressed data according to still another embodiment of the disclosure.

FIG. 11 illustrates a structure of compressed data generated by the compressed data generator 813 of the image processing apparatus 100 according to still another embodiment of the disclosure. The compressed data may include at least one of information for controlling the postprocessor, information about a predetermined section itself, and information for decompressing the information and the first part. FIG. 11 shows an example of the compressed data generated when a section corresponding to one image 'frame' is set as a predetermined section, binary arithmetic coding is used as the entropy coding method for the image signal, the coefficient data is split as the first part to be subjected to the compression. In FIG. 11, the compressed data 1100 includes postprocessor control information 1110, i.e. information for postprocessor control, frame-related information 1120 about a predetermined section itself, a compressed data header 1130 for decompressing the compression of the first part, and compressed data 1140.

Here, the frame-related information 1120 refers to data except data of the first part, and may include information corresponding to the size of the 'block' used as a unit for the entropy coding within the frame, a motion vector, etc. Further, as an example of the information for decompressing the first part, the compressed data header 1130 may include information corresponding to All_0_Flag, scan information about a scan direction for the decompression, etc. The compressed data 1100 may include actually compressed data, for example, compressed coefficient data 1140. However, the compressed data is not limited to this structure.

Figure 12:
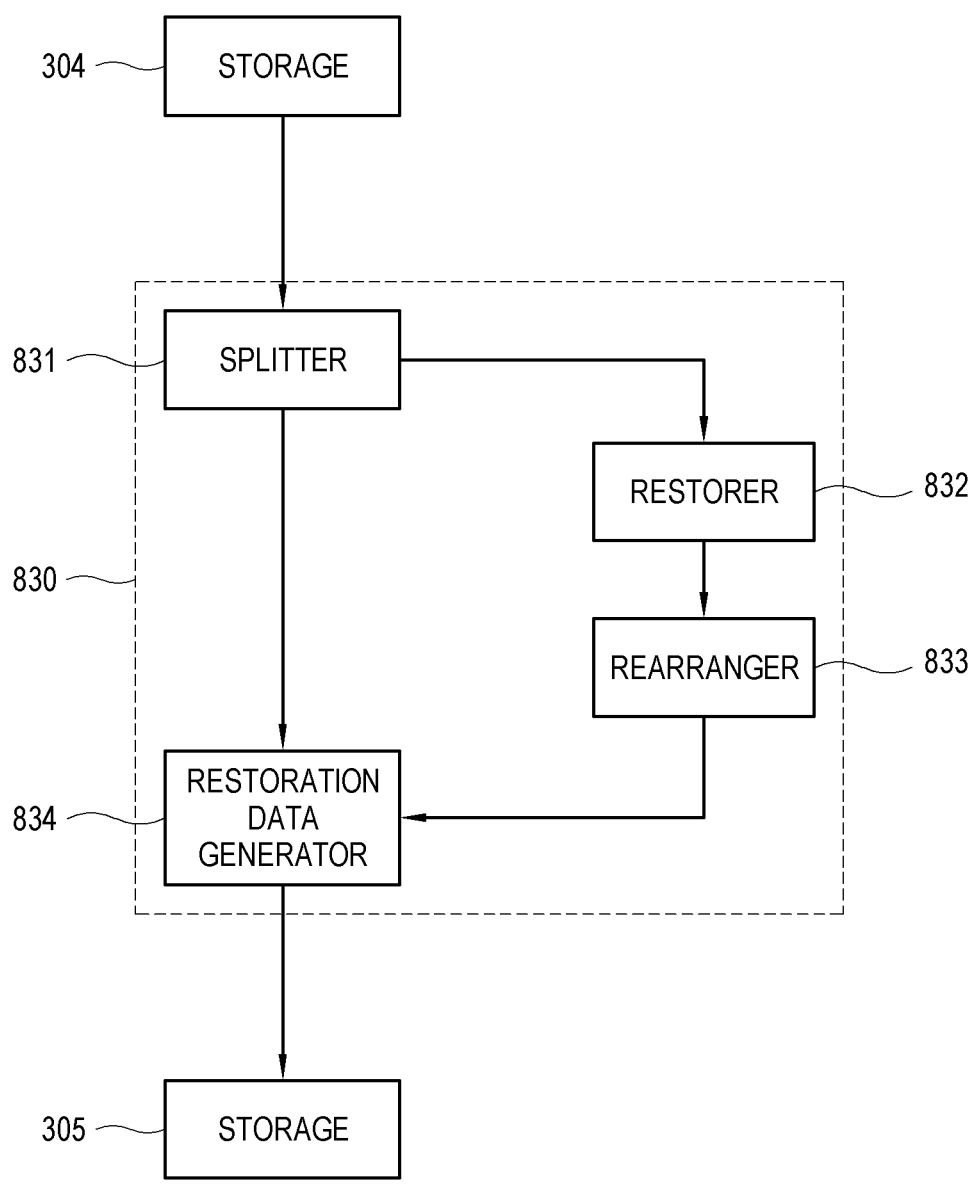
FIG. 12 illustrates a configuration of a decompressor according to still another embodiment of the disclosure.

Meanwhile, when the compressors 810, 820 of the image processing apparatus 100 according to this embodiment of the disclosure include the splitter 811, i.e. when the compressors 810 and 820 perform compression by distinguishing a part of the intermediate signal suitable for the compression and a part unsuitable for the compression, the decompressor 830 may also be designed corresponding to this configuration. For example, as shown in FIG. 12, the decompressor 830 may include a splitter 831, a decompressor a restorer 832, a rearranger 833, and a restoration data generator 834.

The splitter 831 of the decompressor 830 splits actually compressed data and uncompressed data from the compressed data. When the data input to the decompressor 830, i.e. the compressed data stored in the storage 304 is given as shown in FIG. 11, the splitter 831 splits the actually compressed data, i.e. compressed coefficient data 1140 from the compressed data, transmits the split actually-compressed data to the restorer 832, and transmits the other data to the restoration data generator 834.

The restorer 832 receives the compressed coefficient data 1140 from the splitter 831 and restores the compressed data. Specifically, the restorer 832 checks 'All_0_Flag' of the compressed data header 1130, restores the data by generating and outputting a predetermined number of pieces of data corresponding to '0' when 'All_0_Flag' is set as 'True', and performs DPCM after Golomb-Rice decoding when 'All_0_Flag' is set as 'False'

The rearranger 833 rearranges the restored data to have the same arrangement as the previous data of before the compression. As described above, the compressors 810 and 820 may perform compression in order of higher compression rates with respect to original data, for example, in an order in which the sums of absolute differential values from previous data is minimized so as to increase a compression efficiency. In this case, the decompressed data needs to be rearranged in the foregoing order so that the decompressor 830 can generate data having the same arrangement as the previous data of before the compression. To this end, the rearranger 833 may use a rearrangement table, and values of the rearrangement may be changed to correspond to various compression orders.

The restoration data generator 834 receives uncompressed data from the splitter 831 and data decompressed through the restorer 832 and having the same arrangement as the original data through the rearranger 833, and generates restoration data, i.e. the same signal as the intermediate signal of before the compression, thereby transmitting the restoration data to the postprocessor 305.

What is claimed is:
1. An image processing apparatus comprising:
an image signal receiver comprising communication circuitry and configured to receive an image signal comprising a plurality of sections;
a first preprocessor configured to sequentially processes a first section of the plurality of sections and generate a first intermediate signal;
a second preprocessor arranged in parallel with the first preprocessor and configured to sequentially process a second section of the plurality of sections and generate a second intermediate signal;
a storage comprising a memory and configured to store the first intermediate signal and the second intermediate signal; and
a postprocessor configured to perform signal processing with regard to the first intermediate signal and the second intermediate signals stored in the storage,
wherein sizes of the first section and the second section correspond to processing speeds of the first preprocessor and the second preprocessor, and a processing speed of the postprocessor.
2. The image processing apparatus according to claim 1, wherein the first section or the second section comprises a signal sequentially referenced at preprocessing of the first preprocessor or the second preprocessor.

3. The image processing apparatus according to claim 1, wherein the first preprocessor and the second preprocessor perform binary arithmetic coding with regard to the image signal.

4. The image processing apparatus according to claim 1, wherein, while the postprocessor processes the first intermediate signal and the second intermediate signal stored in the storage, each of the first preprocessor and the second preprocessors processes a next section of the image signal.

5. The image processing apparatus according to claim 1, further comprising a controller configured to adjust the sizes of the first section and the second section based on real-time processing speeds of the first preprocessor and the second preprocessor, and the processing speed of the postprocessor.

6. The image processing apparatus according to claim 1, further comprising a compressor configured to compress the first intermediate signal and the second intermediate signal to be stored in the storage.

7. The image processing apparatus according to claim 6, wherein the compressor comprises a splitter configured to split and output a first part to be compressed from the first intermediate signal and the second intermediate signal.

8. The image processing apparatus according to claim 7, wherein the splitter splits the first part based on a signal amount and similarity between signals.

9. The image processing apparatus according to claim 7, wherein compressed data output from the compressor comprises at least one of information for controlling the postprocessor, information about the first section, or information for decompressing the compression of the first part.

10. A method of controlling an image processing apparatus, the method comprising:
receiving an image signal comprising a plurality of sections;
sequentially processing, by a first preprocessor, a first section of the plurality of sections and generating a first intermediate signal;
sequentially processing, by a second preprocessor, a second section of the plurality of sections in parallel with the generation of the first intermediate signal and generating a second intermediate signal;
storing the first intermediate signal and the second intermediate signal; and
performing signal postprocessing with regard to the stored first intermediate signal and the stored second intermediate signal,
wherein sizes of the first section and the second section correspond to processing speeds of the first preprocessor and the second preprocessor, and a processing speed of the postprocessor.

11. The method according to claim 10, wherein the first section or the second section comprises a signal sequentially referenced at the generation of the first intermediate signal and the generation of the second intermediate signal.

12. The method according to claim 10, wherein the generation of the first intermediate signal and the generation of the second intermediate signal comprise performing binary arithmetic coding with regard to the image signal.

13. The method according to claim 10, wherein, while the postprocessing is performed, a next section of the image signal is performed in each of the generation of the first intermediate signal and the generation of the second intermediate signal.

14. The method according to claim 10, further comprising adjusting the sizes of the first section and the second section based on real-time processing speeds at the generation of the first intermediate signal and the second intermediate signal, and the processing speed of the postprocessing.

15. The method according to claim 10, further comprising compressing the first intermediate signal and the second intermediate signal.

* * * * *